Aug. 21, 1928.
R. RUEFF
1,681,197
VESSEL WITH HANDLES
Filed July 29, 1927
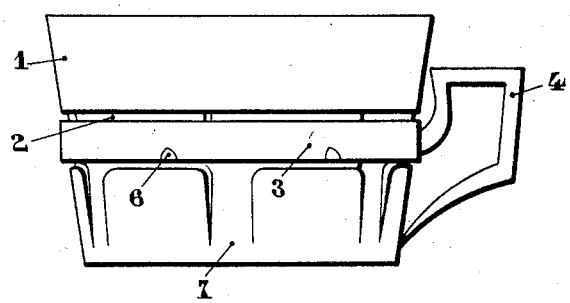
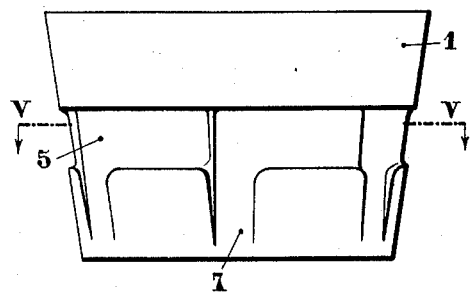
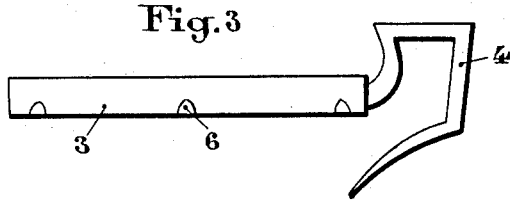
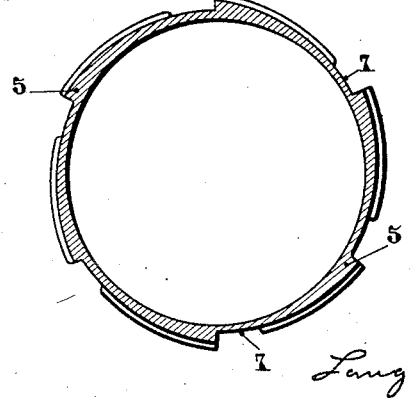
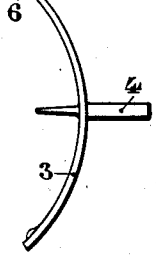
INVENTOR
Renée Rueff Patented Aug. 21, 1928.

1,681,197

UNITED STATES PATENT OFFICE.

RENÉE RUEFF, OF PARIS, FRANCE, ASSIGNOR TO SOCIÉTÉ ECONOMIQUE DE PARIS, OF PARIS, FRANCE, A CORPORATION OF FRANCE.

VESSEL WITH HANDLES.

Application filed July 29, 1927, Serial No. 209,331, and in France May 21, 1927.

This invention relates to vessels with handles particularly cups. Cups are known with detachable handles secured thereto by means of a collar put in place by a kind of bayonet joint. The manufacture of these cups, however, is somewhat complicated owing to the fact that it is necessary to have several types of collar handles, differing as regard diameter, to enable same to be fitted exactly to cups the diameters of which, in spite of care taken in manufacture, are not absolutely constant, particularly owing to shrinkage consequent upon the firing of the cups; it is in fact necessary, if the rotation of the collar around the cup and its falling off is to be prevented, to make the internal diameter of the collar correspond very exactly with the diameter of the cup.

The present invention has for its object to provide improved cups and other vessels with detachable handles, the improvements enabling the above mentioned disadvantages to be avoided and the manufacture of collar handles to be reduced to one single type. This result is achieved by the fact that the surface of the cup or other vessel, in the neighbourhood of the circumferential groove in which the above mentioned collar is usually fitted, comprises inclines on which projections carried by the said collar can move when the collar is turned around the cup, the rotating movement enabling the collar to be cramped on to the cup to the desired degree.

In the attached drawing is shown diagrammatically and solely by way of example a particular embodiment of the invention.

Fig. 1 is an elevation of the improved cup, provided with its collar handle.

Fig. 2 is an elevation of the same cup, with the collar handle removed.

Fig. 3 is an elevation of the combined collar and handle with which the cup is provided.

Fig. 4 is a plan view of a part of the handle shown in elevation in Fig. 3.

Fig. 5 is a section on the line V—V of Fig. 2.

The cup 1 has a groove 2 in which can be fitted the collar 3 integral with the handle 4; the groove is furnished with a certain number of inclines or arcuate cam-shaped projections 5 on which move the projections 6 carried by the collar 3, when the collar is turned around the cup to place it in position. The cup is also provided with channels 7 through which the projections 6 are passed to enable the collar 3, which as shown is endless, to be slipped up the cup to bring it into the groove 2.

Owing to the presence of the projections 6, when the collar has been passed up the cup and turned in the groove, the collar can no longer fall, as its projections are not opposite to the channels 7; but owing to the presence of the inclines 5, if the diameter of the collar 3 does not correspond very exactly to the diameter of the groove, it is possible by turning the said collar so that the projections 6 ride up on the inclines 5, to cramp the collar on to the cup to the desired extent. In this way owing to this effective cramping, any inadvertent turning of the collar can be avoided and consequently the possible fall of the handle if the said rotation should have brought the projections into register with the channels 7.

Consequently the present invention enables the number of types of collar-handles intended to be fitted to a predetermined type of cup to be reduced to one only, as owing to the projections and the inclines one and the same handle may be fixed into cups of slightly different diameter; it also permits a certain tolerance as regards the diameter of the collar in the manufacture of collar-handles.

Naturally the invention is in no way limited to the shape of cup shown in the attached drawing, but may be applied to any cups and even to other handled vessels, beer pots, and the like.

What I claim is:

A vessel comprising in combination a cup provided with a circumferential groove, the bottom wall of said groove being formed with a plurality of inclines, said cup being formed with a plurality of other grooves leading into the circumferential groove at an angle, a detachable collar with a handle, said collar being provided with a plurality of projections adapted to enter said circumferential groove through said other grooves and to engage said inclines by rotation of said collar, to cramp the cup.

In testimony whereof I have signed my name to this specification.

RENÉE RUEFF.